US006550904B2

(12) United States Patent
Koitabashi et al.

(10) Patent No.: US 6,550,904 B2
(45) **Date of Patent: *Apr. 22, 2003**

(54) INK PRINTING METHOD AND INK PRINTER

(75) Inventors: Noribumi Koitabashi, Yokohama (JP); Hitoshi Tsuboi, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/468,117

(22) Filed: Dec. 21, 1999

(65) Prior Publication Data

US 2002/0196303 A1 Dec. 26, 2002

(30) Foreign Application Priority Data

Dec. 25, 1998 (JP) .......................................... 10-376679

(51) Int. Cl.$^{7}$ ............................................... G01D 11/00
(52) U.S. Cl. ....................... 347/100; 347/104; 347/101
(58) Field of Search ............................... 347/100, 101, 347/16, 14, 104

(56) References Cited

U.S. PATENT DOCUMENTS

| | | | | |
|---|---|---|---|---|
| 5,221,334 A | | 6/1993 | Ma et al. | 106/20 D |
| 5,519,085 A | | 5/1996 | Ma et al. | 524/503 |
| 6,084,619 A | * | 7/2000 | Takemoto et al. | 347/100 |
| 6,234,601 B1 | * | 5/2001 | Hayashi et al. | 347/16 |

FOREIGN PATENT DOCUMENTS

| | | |
|---|---|---|
| JP | 5-179183 | 7/1993 |
| JP | 7-53841 | 2/1995 |
| WO | WO 96/18695 | 6/1996 |
| WO | WO 96/18696 | 6/1996 |

* cited by examiner

*Primary Examiner*—John Barlow
*Assistant Examiner*—Manish S Shah
(74) *Attorney, Agent, or Firm*—Fitzpatrick, Cella, Harper & Scinto

(57) ABSTRACT

There are provided a plain paper mode in which printing is performed on a plain paper and a special medium mode in which printing is performed on a special printing medium having a coat layer formed thereon. In the plain paper mode, Bk ink using both self-dispersing type pigment and dye as coloring materials is ejected from a Bk head, then a processing liquid with a high penetrability which insolubilizes the above coloring materials is ejected from a S head. On the other hand, in the special medium mode, the above Bk ink is ejected from the Bk head, but no processing liquid is ejected from the S head. As a result, this enables the improvement in a print quality, such as OD level, and a high-speed fixing in ink-jet printing in either case where a printing medium having a coat layer formed thereon is used or where the plain paper is used.

28 Claims, 7 Drawing Sheets

INK PRINTING METHOD AND INK PRINTER

This application is based on patent application No. 10-376679 (1998) filed Dec. 25, 1998 in Japan, the content of which is incorporated hereinto by reference.

BACKGROUND OF THE INVENTION

1. Field of the Invention

The present invention relates to an ink printing method and an ink printing apparatus, and more particularly to the ink printing method and the ink printing apparatus which perform printing by using a processing liquid insolubilizing a colorant in an ink. The ink printing method and the ink printing apparatus of the present invention are applicable to equipment such as a printer, a copy machine, a facsimile machine or the like, which prints letters, images or the like on a printing medium such as paper or the like, and also used as a printing mechanism in such equipment.

2. Description of the Prior Art

An ink printing technique has an advantage of being essentially applicable to all types of printing medium. Owing also to this advantage, many of printers or the like utilizing the ink-jet printing technique are adapted to be able to use various types of printing medium such as plain paper, coated paper, transparency film for use in OHP, glossed paper and glossed film. On the other hand, there is a fact that the printers or the like have been desired to perform printing of higher quality and higher speed with the spread of the ink-jet type printers. More concretely, the reflection optical density (hereinafter referred to as "OD") at the same level as an electrophotographic method and high-speed fixing is required in printing characters such as black letters and so on. These circumstances are true for not only printing black letters but also printing full color images.

As an example of prior art trials to increase OD, there is proposed a configuration in which pigment ink is used for making much of printed quality of characters on plain paper. As another example, there is known a configuration in which dye ink and a processing liquid for insolubilizing the ink are used to perform printing.

As an example of such pigment ink for use in ink printing, there is disclosed one type of ink in which pigment is dispersed with AB, BAB type block polymers in Japanese Patent Application Laid-Open No.5-179183 (1993). There is disclosed another type of pigment ink in which pigment is dispersed with ABC type tri-block polymer in Japanese Patent Application Laid-Open No. 7-53841 (1995).

Further, there is known a self-dispersion type pigment ink in which a dispersant like the above block polymers is not used. As an example of this type ink, there is disclosed pigment ink in which carbon black as a pigment is dispersed by directly bonding a hydrophilic group to its surface in WO 96/18695 and WO 96/18696 related to International Patent Application.

In the systems using the pigment ink, however, coagulation of a pigment sometimes may occur on the surface of the printing medium depending on a type of the printing medium, which leads to a production of the image lacking uniformity in fixing a coloring material.

Further, when intensity of reaction causing the coagulation is relatively high, not only the non-uniform coagulation as described above is caused, but also a "crack", which is a portion lacking the coloring material, may be caused in the pigment fixed on a printing medium.

FIG. 1 is a schematic view showing a "crack" phenomenon. As can be seen from the figure, a size of the "crack" is relatively large and recognizable to the naked eye; thus, a presence of the "crack" itself causing deterioration of the print quality. Further, an appearance of a printing medium ground at a portion of the "crack" may cause decreasing of OD as a whole of the printed image.

Such "crack" often occurs particularly in the printing medium, such as transparency film, having a resin coat layer formed on it which promotes acceptance of ink and is effective in high-speed fixing of the same. This is because the coagulation of the pigment on the resin coat layer depends on a substance contained in the resin. Anionic pigment ink rapidly coagulates especially when the resin coat layer contains a cationic substance.

Further, in printing systems using dye ink, when using the printing medium having the above coat layer formed thereon, a beading phenomenon sometimes may occur in which ink droplets form into a string like that of beads, as shown in FIG. 2, which may cause deterioration of print quality. This is because dye poorly wets the coat layer.

On the other hand, when increasing OD on the plain paper by using the pigment ink or both the dye ink and the processing liquid jointly, ink with lower penetrability is employed so that as much coloring material, such as pigment and so on, as possible will remain in a vicinity of the surface of the printing medium. Thus, when intending to increase OD on the plain paper, there arises a problem with fixing properties of ink.

SUMMARY OF THE INVENTION

An object of the present invention is to provide an ink printing method and an ink printing apparatus which make it possible to improve print quality, for example, OD level, and realize a high-speed fixing of ink in performing printing on various printing medium, particular, on a plain paper and a printing medium provided with a coat layer formed thereon (hereinafter referred to as a "special printing medium").

In a first aspect of the present invention, there is provided an ink printing method of applying ink containing at least a pigment as a coloring material onto a printing medium to perform printing, the method comprising the steps of:

providing a plurality of printing modes to be set corresponding to mode setting information, the plurality of printing modes including a printing mode for applying the ink and a processing liquid for promoting solidification of the coloring material in the ink onto the printing medium and a printing mode for applying no processing liquid but the ink onto the printing medium; and selecting one mode corresponding to the mode setting information among the plurality of printing modes in accordance with a type of the printing medium to perform printing.

In a second aspect of the present invention, there is provided an ink printing apparatus for applying ink containing at least a pigment as a coloring material from a print head onto a printing medium to perform printing, the apparatus comprising:

mode setting means for setting a plurality of printing modes to be set corresponding to mode setting information, the plurality of printing modes including a printing mode for applying the ink and a processing liquid for promoting solidification of the coloring material in the ink onto the printing medium and a printing mode for applying no processing liquid but the ink onto the printing medium; and print performing means for selecting one mode corresponding to the mode setting information among the plurality of printing modes in accordance with a type of the printing medium to perform printing.

According to the above configuration, it is possible to selectively carry out a mode for performing printing using both ink and the processing liquid jointly and a mode for performing printing not using the processing liquid but using ink alone. Thus, in the case of performing printing on a special printing medium provided with a coat layer formed thereon, for example, the mode using ink alone can be selected, and moreover, as the used ink, ink containing a mixture of the pigment and the dye may be selected to perform printing without causing deterioration in image quality, such as a crack on the coat layer, but printing with a high OD and a high-speed fixing. On the other hand, the mode is selected in which both ink and the processing liquid are used jointly as described above to perform printing in which an edge of the printed image is sharp without feathering and OD is high. Moreover, when the processing liquid is selected to have a high penetrability, in other words, to have a penetrability that agrees with a Ka value, an acetylenol content and surface tension shown in Table 1 described later, a high-speed fixing of ink can be also realized.

A term "insolubilization" used in the present specification does not mean just complete insolubilization, but it has a broader concept including an action promoting the insolubilization.

The above and other objects, effects, features and advantages of the present invention will become more apparent from the following description of embodiments thereof taken in conjunction with the accompanying drawings.

DESCRIPTION OF THE PREFERRED EMBODIMENTS

Embodiments of the present invention will be described in detail with reference to the attached drawings.

Embodiment 1

In the present embodiment, printing is carried out according to a printing mode that is changed depending upon a type of a printing medium used for the printing. More specifically, printing modes are changed depending upon whether the printing medium used is a plain paper or a special printing medium.

When selecting a plain paper mode, printing is performed with ink using a mixture of self-dispersing type pigment and dye as a colorant as well as a processing liquid causing coagulation and insolubilization of the colorant. In this case, an ink having a relatively low penetrability and a processing liquid having a high penetrability as compared with the above ink are used. Thus, a reaction of the pigment and the dye with the processing liquid enable characters, images or the like whose edges are free from bleeding and are hence sharp, to be formed, and make the colorant in the ink remain in the vicinity of a surface layer of the printing medium so as to increase OD. In this case, the use of the processing liquid having the high penetrability accelerates the penetration of the above ink solvent into the printing medium, which leads to realizing a high-speed fixing.

On the other hand, when selecting a special medium mode, the ink alone, which contains the above mixture of the colorant, is used and the processing liquid is not used.

In this case, the pigment contained in the ink is such that it has at least one type of anionic group bonding to its surface directly or via the other atomic group.

Figure 3:
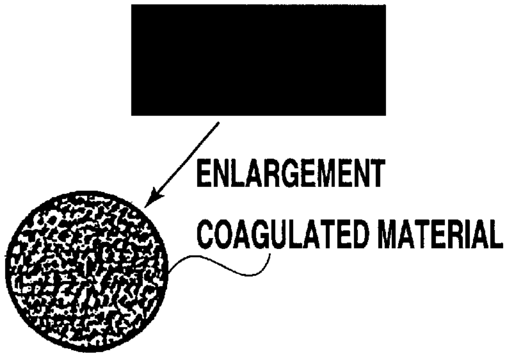
FIG. 3 is a schematic view showing a result of printing performed according to a first embodiment of the present invention.

FIG. 3 is a schematic view showing a result of printing when selecting the special medium mode in accordance with the present embodiment and an enlarged fragmentary view of the same, the result being what is called "solid print" obtained at a print duty of 100%.

Figure 1:
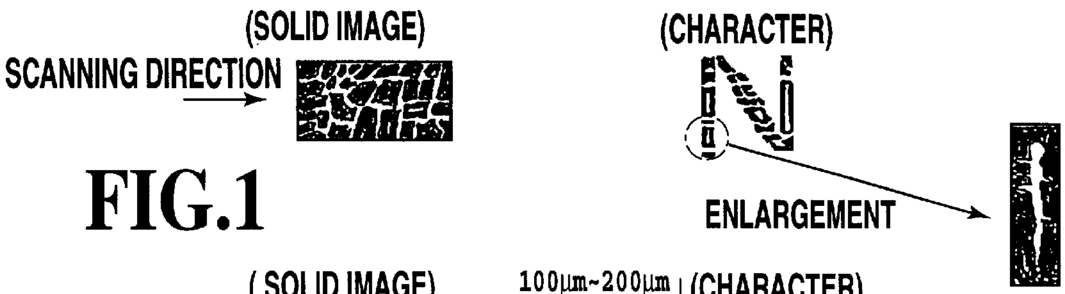
FIG. 1 is a schematic view showing a result of prior art printing performed on a coated paper or the like by using pigment ink.
Figure 2:
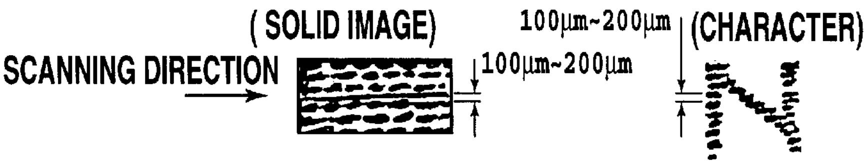
FIG. 2 is a schematic view showing a result of prior art printing performed on a coated paper or the like by using dye ink.

As shown in the enlarged view of FIG. 3, when printing is performed using the ink of the present embodiment, the coagulation of pigment exists in a form of fine particles, each coagulated particle of the pigment is surrounded by the dye, and a part in the printing medium where no pigment exists is filed up with the dye. As is apparent also from this, the "crack" as shown in FIG. 1 does not occur. According to estimation by the inventors of the present invention, this is because the ink of the present embodiment contains the pigment without dispersant (self-dispersing type pigment) and the dye.

More specifically, it is estimated that, since the ink of the present embodiment contains no dispersant such as high-molecular compound, the intensity of the coagulation of the pigment is kept low, as a result of which larger coagulated products are not produced so as to cause no "crack."

Also in this embodiment, there still exists certain coagulation in the ink as described above, though a coagulating force is not so great. The existence of the dye in the ink of the present embodiment, however, can make such coagulating force lowered. Then, it is considered that it may be possible to get rid of non-uniformity in the printed image caused by coagulation having a certain intensity but not enough to cause "crack."

In the images or the like printed with the ink of the present embodiment in which the above described phenomenon is supposed to occur, the colorants are uniformly distributed as described above, OD (optical reflection density) becomes high, and the coat layer exhibits relatively high fixing property intrinsic thereto.

It should be understood that the ink of the present embodiment is not limited to certain types (colors) of dye and pigment. However, preferably the black ink of the present embodiment is used. With the black ink of the present embodiment, an improvement in OD is expected in printing characters such as letters.

Now a preferred embodiment of the black pigment will be described below.

In the present embodiment used is the self-dispersing type black pigment in which at least one type of anionic group is bonded to the surface of carbon black directly or via the other atomic group. However, the self-dispersing type carbon black in which at least one type of hydrophilic group is bonded to its surface directly or via the other atomic group can be used as the colorant. As a result, a dispersant for dispersing carbon black becomes unnecessary. The self-dispersing carbon black used in the present invention is preferably ionic, and suitably it is anionically charged.

The hydrophilic groups bonded to anionically charged carbon black include, for example, —COOM, —$SO_3M$, —$PO_3HM$, —$PO_3M_2$, —$SO_2NH_2$, —$SO_2NHCOR$ (wherein M represents hydrogen atom, alkaline metal, ammonium, or organic ammonium, R represents C1–12 alkyl group, phenyl group which may have substituents, or naphthyl group which may have substituents). In the present embodiment, carbon black anionically charged with —COOM, —$SO_3M$ bonded on its surface is preferably used.

"M" in the above hydrophilic group includes, for example, lithium, sodium and potassium, as an alkaline metal, and mono-, di- and tri-methylammonium, mono-, di- and tri-ethylammonium, mono-, di- and tri-methanolammonium, as organic ammonium. The methods of obtaining anionically charged carbon black include for example, oxidation treatment of carbon black with sodium hypochlorite to introduce —COONa to the surface of the carbon black. However, it is to be understood that the invention is not intended to be limited to the specific methods.

Embodiment 2

In the present embodiment, printing is carried out according to a selected printing mode from a plain paper mode and a special medium mode, in the same manner as in case of Embodiment 1.

In the plain paper mode, pigment ink using self-dispersing type pigment as a coloring material, dye ink using dye as a coloring material, and a processing liquid with high penetrability are applied to a printing medium in this order. This configuration enables printing in which an edge of the printed image is sharp, OD of the printed image can be increased, and high-speed fixing can be realized, same as in the case of Embodiment 1 where ink with pigment and dye previously mixed with each other is used.

On the other hand, in the special medium mode, only the pigment ink and die ink described above are used, but no processing liquid.

Figure 4:
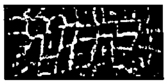
FIG. 4 is a schematic view showing a result of printing performed according to a second embodiment of the present invention.

FIG. 4 is a schematic view showing a result of printing in the special medium mode of the present embodiment. In this case, the "crack" described above is observed microscopically, but not particularly noticeable at a distance (for example, of 20 cm or more). This is attributed to the same thing as described above with reference to FIG. 1. That is, although pigment causes the crack by reacting with the resin of the coat layer, the crack is filled up with the dye provided subsequently to the pigment.

Thus, disadvantages of pigment ink and dye ink to the special printing medium are made up of applying the dye ink to the special printing medium after applying the pigment ink, which leads to printing images of high quality. It has been also verified that the shorter the time interval between applying the pigment ink and applying the dye ink, the more the result of printing become like that of Embodiment 1.

Embodiment 3

In the third embodiment of the present invention, pigment ink and dye ink are applied to a printing medium in a reverse order to the above Embodiment 2.

More specifically, in the plain paper mode, the dye ink, the pigment ink and the processing liquid are applied in this order, and in the special medium mode, the dye ink and the pigment ink are applied in this order.

Figure 5:
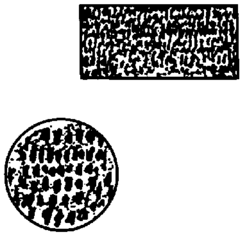
FIG. 5 is a schematic view showing a result of printing performed according to a third embodiment of the present invention.

FIG. 5 is a schematic view showing a result of printing in the special medium mode of the present embodiment. The result is such that, on a microscopic scale, the pigment is incorporated into the dye in a somewhat coagulated state and fixed to the printing medium. However, in this case, the coagulated products are not particularly noticeable at a distance (of 20 cm or more). It is supposed that in the above fixing state, the dye applied to the printing medium earlier than the pigment functions as a kind of buffer against the coat layer in terms of reaction, which weakens the coagulating force of the pigment, consequently causing slow coagulating.

In the present embodiment also, high quality printing which causes no problem with respect to the special printing medium can be performed.

In the three embodiments described above, when selecting the special medium mode, the processing liquid is not used. Normally there may arise no problem in the use of the processing liquid for the print medium having a coat layer formed on it. However, one of the reasons that the processing liquid is not used in the above embodiments is that the coat layer essentially exhibits a good wetting ability, in particular, to the pigment ink; therefore, if ink contains the pigment as a colorant, it will exhibit relatively high fixing properties. And another reason is that the consumption of the processing liquid can be reduced.

Further, in the above Embodiments 2 and 3, the amounts is of the pigment ink and the dye ink applied may be made different from each other. For example, the pigment ink is compatible with (exhibits a good wetting ability to) the special printing medium, while the dye ink is not. Accordingly, when selecting the special medium mode, it is possible to increase the amount of the pigment ink applied relative to that of the dye ink. Moreover, such an amount can be made different by making an ejection amount from each print head different from each other or making the thin-out rates of each applying ink different from each other.

Furthermore, although the self-dispersing type pigment is used in the above embodiments, the pigment used is not limited to this, it may be the type of pigment using dispersant. The reason is that due to the use of the dye ink at the same time, relatively large crack, as shown in FIG. 1, does not occur in printing on the special medium.

Now the concrete examples of the above embodiments will be described with reference to the attached drawings.

EXAMPLE 1

Figure 6:
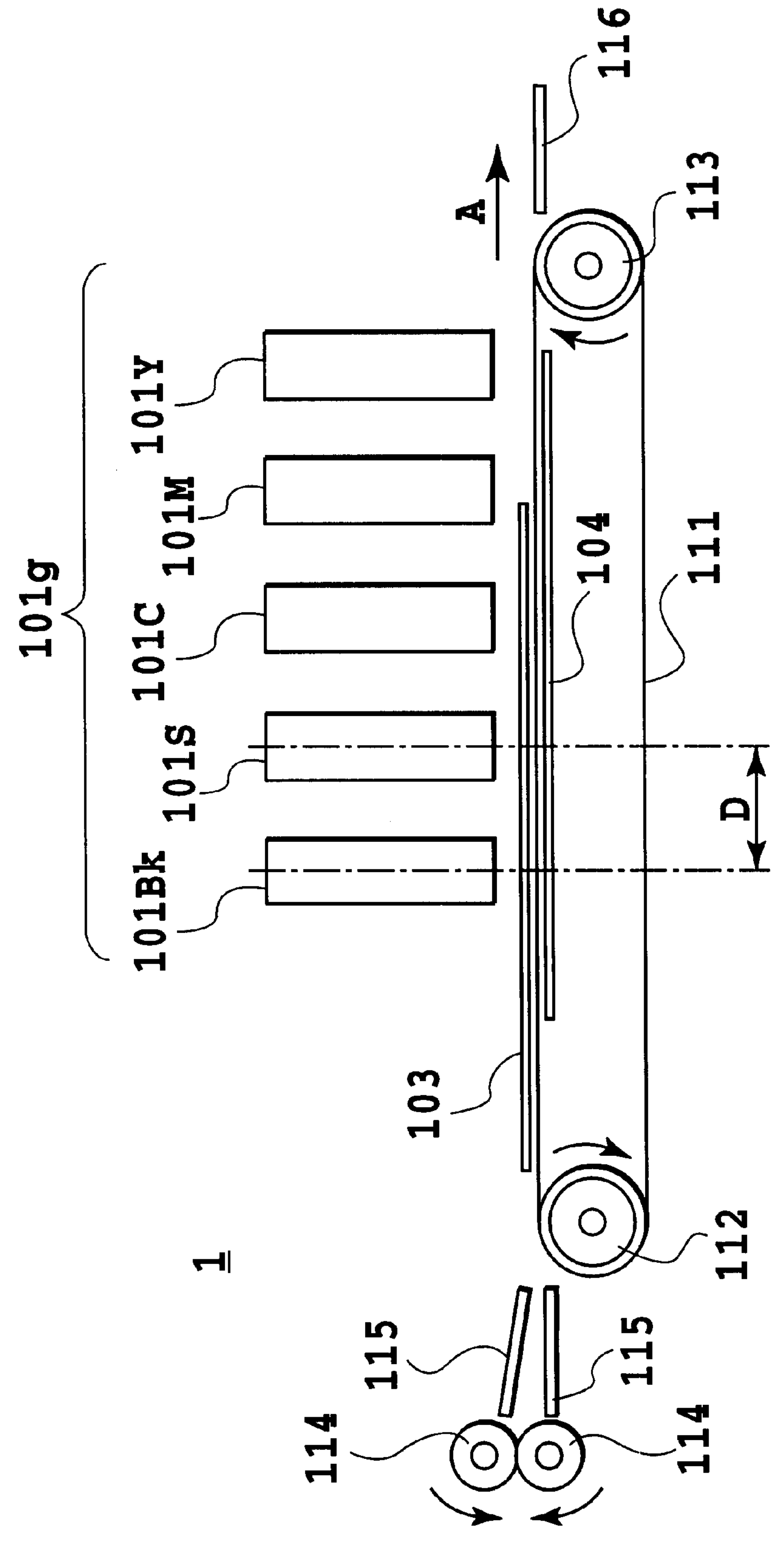
FIG. 6 is a side view showing a general configuration of a printer according to one example of the present invention.

FIG. 6 is a view generally showing a structure of a full-line type printer according to one example of the present invention, and shows a configuration corresponding to Embodiment 1 described above.

The printer adopts an ink printing method where a plurality of full-line type printing heads are arranged along a printing medium conveyed direction (shown by arrow A in the figure) and eject an ink or processing liquid to perform printing. Such printing operations are controlled by a control circuit (not shown).

Printing heads 101Bk, 101S, 101C, 101M and 101Y, which make up a head group 101*g*, are respectively equipped with approximately 7200 ink ejection ports arranged in a width direction (perpendicular to the paper on which the figure is shown) of the printing medium conveyed in the arrow A direction to be capable of printing A3-size medium at the largest.

The printing paper 103 is conveyed in the arrow A direction by a pair of resist rolls 114 driven by a conveying motor and guided by a pair of guide plates 115 to take registration alignment of a top end of the printing paper, and conveyed by the conveying belt 111. The endless conveying belt 111 is supported by two rollers 112 and 113, and the vertical motion of the upper side of the belt is limited by a platen 104. The printing paper 103 is conveyed upon rotation driving of the roll 113, where the printing paper adheres to the belt 111 by means of electrostatic force. The rotation driving of the roller 113 is performed by a driving source, e.g., motor (which is not shown) so as to convey the printing paper 103 in the arrow A direction. The printing paper 103 is subjected to printing by means of the head group 101*g*, while the printing paper is conveyed with the conveying belt 111, and then discharged onto a stacker 116.

Figure 11:
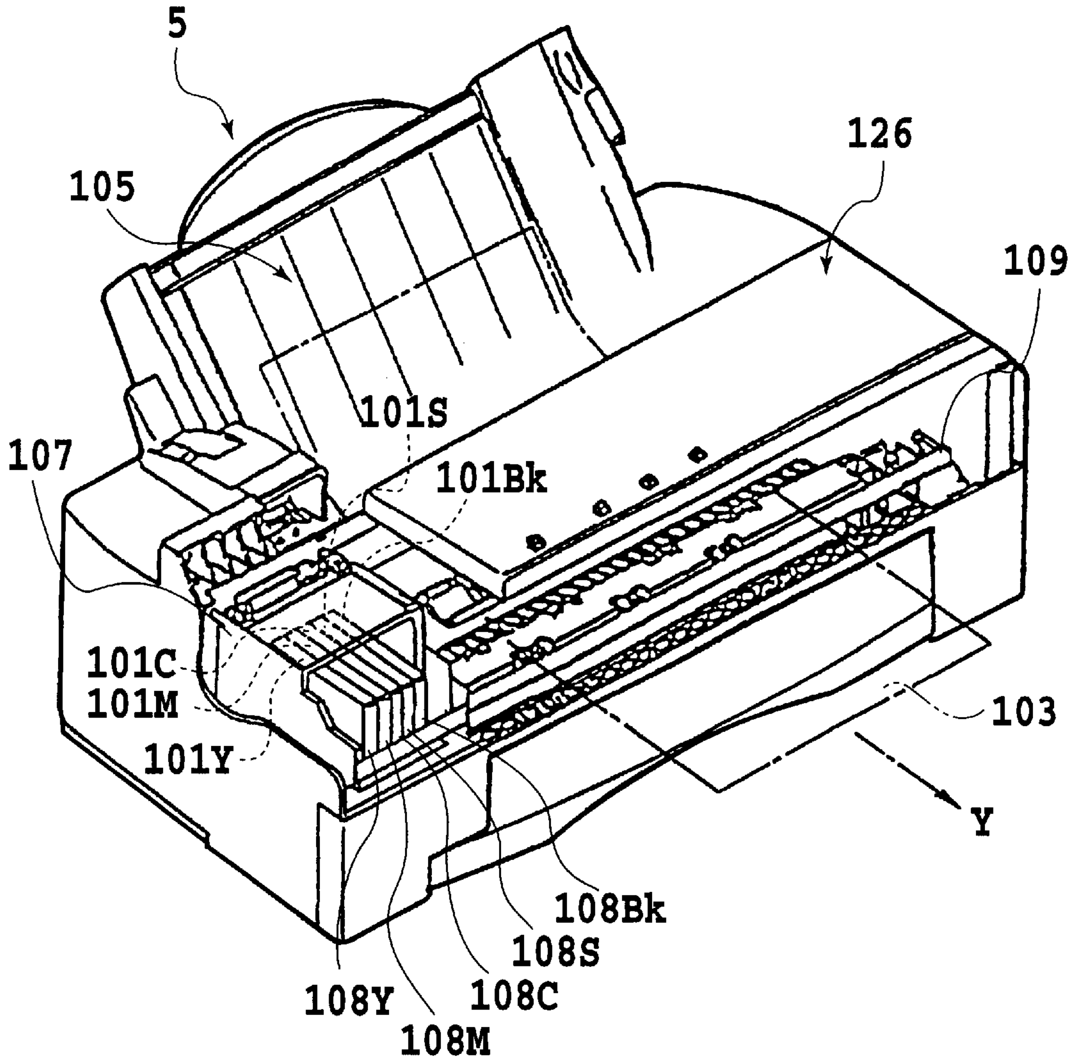
FIG. 11 is a perspective view showing a serial printer according to another example of the present invention.

Each print head in the head group 101*g* generates a bubble in the ink or processing liquid by utilizing thermal energy to eject the ink or processing liquid by a pressure the bubble provides. The printer is equipped with the heads 101S and 101Bk ejecting the processing liquid and black (Bk) ink using both the self-dispersing pigment and the dye as a colorant, respectively, described in the above embodiments. It is also equipped with the heads for color inks (101C for cyan, 101M for magenta and 101Y for yellow). These heads are arranged in the direction A in which the printing paper 103 is conveyed, as shown in FIG. 11. These printing heads eject color inks and the processing liquid to print black and color images.

In this example, ink having a characteristic of low penetration speed (hereinafter referred to as up remaining ink in this example) is used as the black ink ejected from the head 101Bk. On the other hand, as the processing liquid or cyan, magenta, and yellow inks which are respectively ejected from heads 101S, 101C, 101M and 101Y, the liquid or ink of higher penetration speed (hereinafter referred to as penetrative inks in this example) is used.

The penetration speed will be described below.

It is known that when penetrability of the processing liquid and ink (hereinafter referred to simply as liquid) is represented by e.g. a penetrated liquid amount V per 1 $m^2$, the penetrated liquid amount V ($ml/m^2=\mu m$) is expressed by Bristow equation as a function of time (t) elapsing after a liquid droplet is ejected.

$$V=Vr+Ka(t-tw)^{1/2}$$

where, Lt>tw.

The liquid droplet is mostly absorbed by the irregularities on the printing paper (roughened portion on the paper), immediately after it lands on the paper, with few droplets penetrating inward. This time span for the absorption is represented by tw (wet time), and quantity of the liquid absorbed by the surface irregularities by Vr. When time (t) after the droplets reach the paper exceeds the time tw, the penetrated liquid amount V increases in proportion to the ½th order, or in proportion to the square root, of the exceeded time span (t-tw). Ka is a proportional coefficient increasing with the penetrated liquid amount, varying with the penetration speed of the liquid. It is hereinafter referred to as penetration coefficient.

Figure 7:
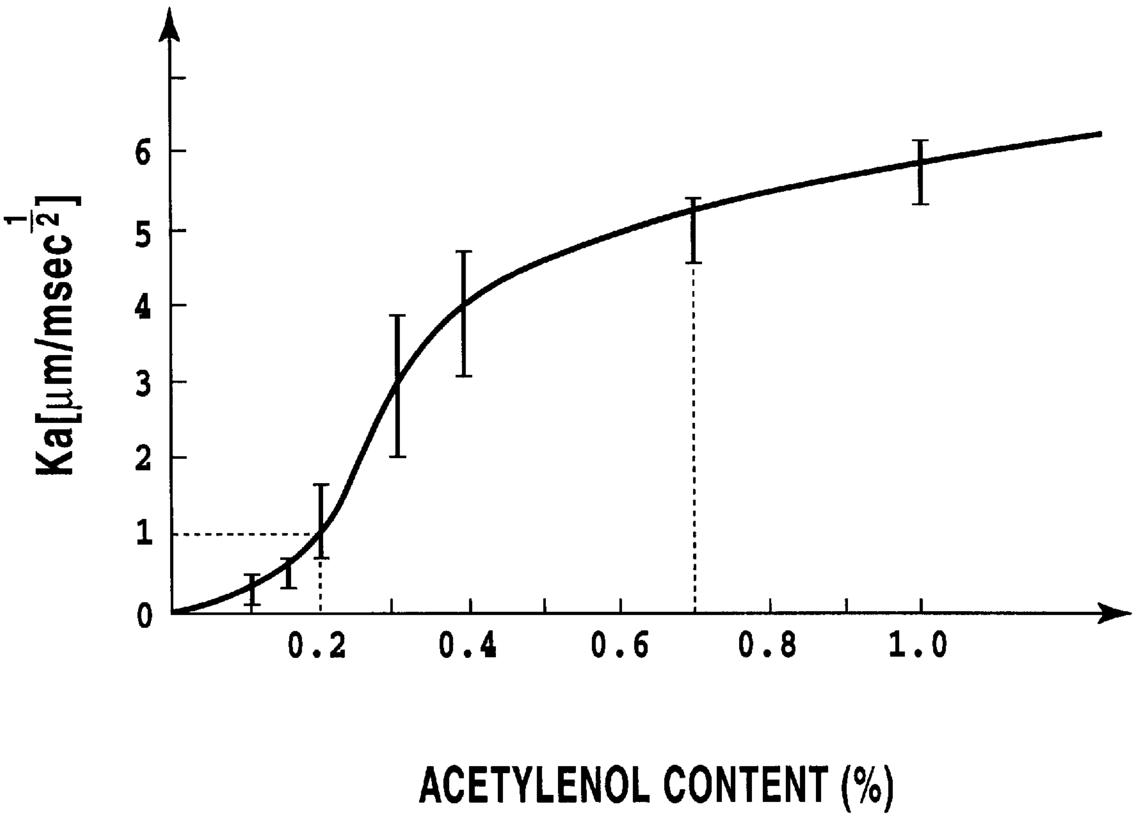
FIG. 7 is a graph showing a relationship between an acetylenol content rate and a Ka value related to a penetrability in the example.

FIG. 7 shows an empirical relationship between the penetration coefficient Ka and acetylenol content in the liquid.

The Ka value is measured by a dynamic liquid penetrability tester S (manufactured by Toyo Seiki Seisaku-sho, Ltd.), based on Bristow method. The printing paper used in this test was PB paper (produced by Canon Inc. as the assignee of the present invention), which can be used for printing both by an electrographic device (e.g., a copy machine and laser beam printer) and an ink-jet printer and is so called plain paper.

The similar results are observed for PPC paper (also produced by Canon Inc.).

As shown in FIG. 7, a curved line shows that the Ka value (the ordinate axis) increases as the acetylenol content (the abscissa axis) increases and the former is determined by the latter, by which is meant that penetration speed of the ink (liquid) is essentially determined by its acetylenol content. The short lines crossing the curved line and parallel to the ordinate axis in the figure represent fluctuation ranges of the experimental data.

Figure 8A:
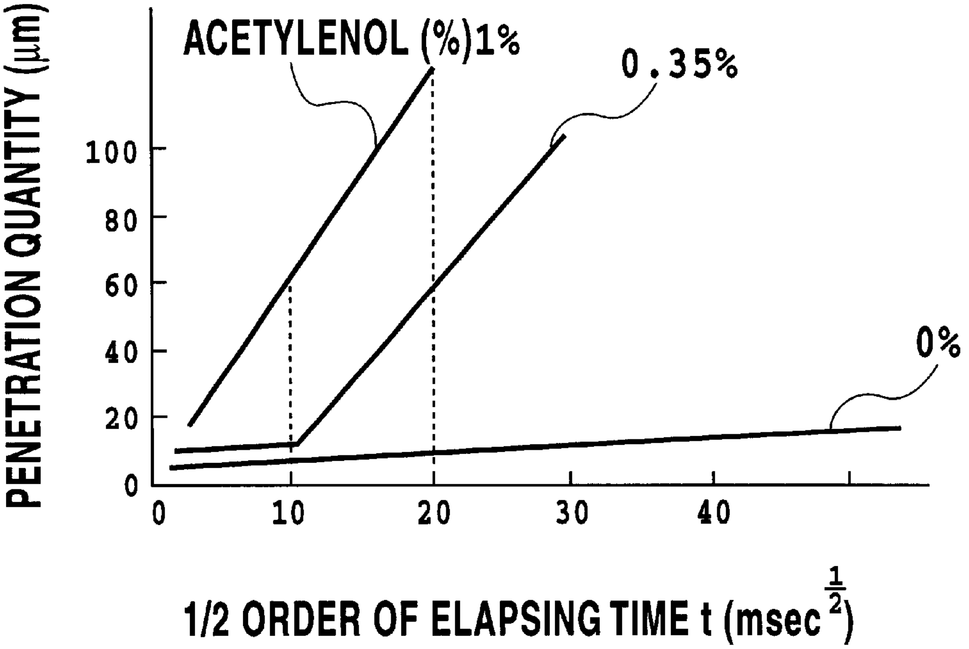
FIGS. 8A and 8B are graphs showing relationships between time elapsed after landing of ink on a printing medium and penetration quantity of the ink with varying an acetylenol content rate related to the penetrability as a parameter.
Figure 8B:
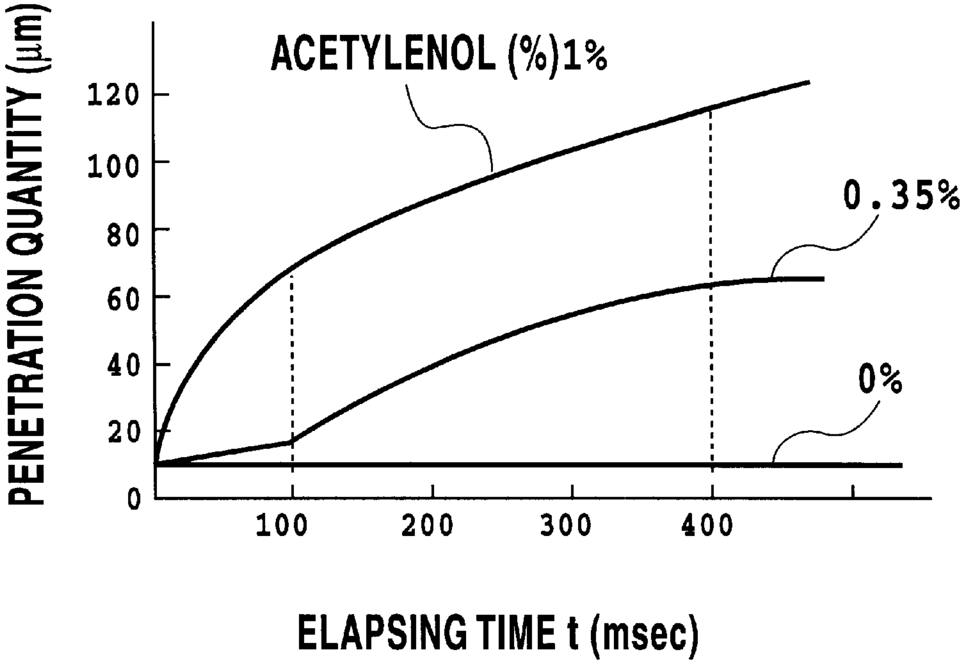

FIGS. 8A and 8B are illustrations showing a relationship between the penetrated liquid amount and the time after the ink reaches the printing paper, and showing a result obtained by an experiment where the printing paper (PB paper) having a weight of 64 $g/m^2$, thickness of approximately 80$\mu$m and void volume of approximately 50% is used.

The abscissa axis in FIG. 8A represents the ½th order of the elapsing time (t) (msec $^{1/2}$), whereas that in FIG. 8B the elapsing time (t) (msec). The ordinate axis in these figures represents the penetrated liquid amount V ($\mu$m). These figures show curved lines for respective acetylenol content 0%, 0.35% and 1% as parameters.

As apparent from these figures, the penetrated liquid amount at a given elapsing time increases and the liquid becomes more penetrative as the acetylenol content increases. Also, these figures show general trends that the wet time (tw) decreases as the acetylenol content increases and penetrability also increases as the acetylenol content increases even prior to the elapsing time reaching the wet time.

The liquid free of the acetylenol (acetylenol content is 0%) is low in penetrability and has a character of the up remaining ink, defined later. On the other hand, the liquid containing 1% of acetylenol quickly penetrates into the printing paper 103 and has a character of the penetrative ink, also defined later. The liquid containing 0.35% of acetylenol has a character intermediate between the two (semi-penetrative ink).

Table 1 summarizes the characteristics or definitions of the up remaining ink (liquid), penetrative ink(liquid) and semi-penetrative ink(liquid).

TABLE 1

| | Ka value ($ml/m^2 \cdot msec^{1/2}$) | Acetylenol content (%) | Surface tension (dyne/cm) |
|---|---|---|---|
| Up remaining ink | Less than 1.0 | Less than 0.2 | 40 or more |
| Semi-penetrative ink | 1.0 or more but less than 5.0 | 0.2 or more but less than 0.7 | 35 or more but less than 40 |
| Penetrative ink | 5.0 or more | 0.7 or more | Less than 35 |

Table 1 shows the Ka value, the acetylenol content (%) and surface tension (dyne/cm) of the up remaining, semi-penetrative and penetrative liquids, used as the ink or processing liquid. Penetrability of these liquids into the printing paper as the printing medium increases as the Ka value increases. In other words, it increases as surface tension decreases.

The Ka value shown in Table 1 was measured by a dynamic liquid penetrability tester S (manufactured by Toyo Seiki Seisaku-sho, Ltd.), based on the Bristow method. The printing paper used in this test was PB paper (produced by Canon Inc. as the assignee of the present invention). The similar results were observed with PPC paper (also produced by Canon Inc.).

Critical micelle concentration (CMC) of a surfactant in a liquid is known to be one of conditions under which the surfactant is dissolved in the liquid. This concentration is the critical level at which a number of molecules are rapidly associated each other to form a micelle when concentration of a surfactant-containing solution increases Acetylenol used to adjust penetrability of the liquid is one type of the surfactant and should similarly have the critical micelle concentration according to the liquid.

As characteristics of a relationship between surface tension and the acetylenol content, it is known that surface tension of a liquid no longer decreases when its acetylenol content increases to begin to form the micelle. From this, it is confirmed that critical micelle concentration (CMC) of acetylenol for a water is approximately 0.7%.

The liquids shown in Table 1 are viewed from critical micelle concentration (CMC). Taking the penetrative ink as an example, it contains acetylenol at a content higher than its CMC with water.

The processing liquid and inks for this example had following compositions, where content of each component is shown by weight parts.

| | |
|---|---|
| [Processing liquid] | |
| Glycerin | 7 parts |
| Diethylene glycol | 5 parts |
| Acetylenol EH (manufactured by Kawaken Fine Chemicals Co., Ltd.) | 2 parts |
| Polyaryl amine (molecular weight: 1500 or less, average molecular weight: approximately 1000) | 4 parts |
| Acetic acid | 4 parts |
| Benzalkonium chloride | 0.5 parts |
| Triethylene glycol monobutyl ether | 3 parts |
| Water | Balance |

-continued

| | |
|---|---|
| [Yellow (Y) Ink] | |
| C.I. direct yellow 86 | 3 parts |
| Glycerin | 5 parts |
| Diethylene glycol | 5 parts |
| Acetylenol EH (manufactured by Kawaken Fine Chemicals Co., Ltd.) | 1 part |
| Water | Balance |
| [Magenta (M) Ink] | |
| C.I. acid red 289 | 3 parts |
| Glycerin | 5 parts |
| Diethylene glycol | 5 parts |
| Acetylenol EH (manufactured by Kawaken Fine Chemicals Co., Ltd.) | 1 part |
| Water | Balance |
| [Cyan (C) Ink] | |
| C.I. direct blue 199 | 3 parts |
| Glycerin | 5 parts |
| Diethylene glycol | 5 parts |
| Acetylenol EH (manufactured by Kawaken Fine Chemicals Co., Ltd.) | 1 part |
| Water | Balance |
| [Black (Bk) Ink] | |
| Pigment dispersant solution | 25 parts |
| Food black 2 at a pigment ratio of 50% | 2 parts |

When pigment ratio is 100%, 10 wt. % of the pigment dispersant solution content is 50 parts, and when pigment ratio is 0% (dye is the sole colorant), food black 2 content is 4 parts.

| | |
|---|---|
| Glycerin | 6 parts |
| Triethylene glycol | 5 parts |
| Acetylenol EH (manufactured by Kawaken Fine Chemicals Co., Ltd.) | 0.1 part |
| Water | Balance |

The pigment dispersant solution is described below: [Pigment Dispersant Solution]

Concentrated hydrochloric acid (5 g of hydrogen chloride dissolved in 5.3 g of water) is incorporated with 1.58 g of anthranilic acid at 5° C. This solution is agitated in an ice bath to be kept at 10° C. or less, and incorporated with a solution comprising 1.78 g of sodium nitrite dissolved in 8.7 g of water at 5° C. The solution is further agitated for 15 min, to which 20 g of as-mixed carbon black (specific surface area: 320 $m^2/g$, and DBP oil absorptivity: 120 ml/100 g) is added. The mixture is further agitated for 15 min, and the resultant slurry is filtered by Filter No. 2 (manufactured by Toyo Roshi Kaisha, Ltd. of Advantec Group). Then, the pigment particles are sufficiently washed with water, dried at 110° C. in an oven, and then mixed with water to prepare a 10 wt. % aqueous solution of the pigment. The pigment dispersant solution 3 thus prepared is dispersed with self-dispersing type carbon black, anionically charged with the hydrophilic group bonded to the carbon black particle surfaces via phenyl group.

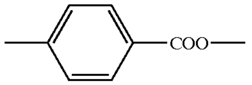

As indicated by the above compositions, the Bk ink is set as the up remaining ink, and the processing liquid and C, M and Y inks as the penetrative inks, according to their acetylenol contents.

The black ink uses a dispersant-free pigment, i.e., contains no dispersant, as described in the above embodiments. This ink suitably uses anionic self-dispersing type carbon black, in which at least one type of hydrophilic group is bonded to the carbon black particle surfaces directly or via another type of atomic group. The self-dispersing type carbon black is preferably ionic, more preferably anionically charged.

The examples of anionically charged carbon black types have a surface-bonded hydrophilic group, such as —COOM, $—SO_3M$, $—PO_3HM$, $—PO_3M_2$, $—SO_2NH_2$, or $—SO_2NHCOR$ (M is hydrogen, an alkaline metal, ammonium or organic ammonium; and R is an alkyl, phenyl which may be substituted or naphtyl which may be substituted, having a carbon number of 1 to 12). The particularly suitable carbon black types for this example are anionically charged ones, with —COOM or $—SO_3M$ bonded to the carbon black particle surfaces.

The alkaline metal M in the hydrophilic group includes lithium, sodium and potassium, and the organic ammonium includes mono- and tri-methylammonium, mono- and tri-ethylammonium, and mono- and tri-methanolammonium. The anionically charged carbon black may be obtained by introducing —COONa to the carbon black particle surfaces, e.g., by oxidation-treating carbon black with sodium hypochlorite. It is needless to say that the method is not limited to the above.

It is preferable for the present example to use carbon black with a hydrophilic group bonded to the particle surfaces via another atomic group. Such atomic groups include an alkyl group, phenyl group which may be substituted and naphtyl group which may be substituted, having a carbon number of 1 to 12. The hydrophilic groups bonded to carbon black particle surfaces via another atomic group include, in addition to the above, $—C_2H_4COOM$, $—PhSO_3M$ and —PhCOOM (Ph is phenyl group), although not limited thereto, needless to say.

The carbon black as the dispersant-free pigment is itself more dispersible in water than the conventional carbon black, thus dispensing with pigment-dispersed resin or surfactant. This brings about various advantages, e.g., higher in adhesion and wettability than the conventional one, and hence excellent in reliability when handled by a printing head.

In this example, the ink ejection ports of each printing head are arranged at a density of 600 dpi, and printing is performed at a dot density of 600 dpi in the printing paper conveying direction. As a result, the image or the like printed in this example has a dot density of 600 dpi both in row and column directions. Further, each head ejects the liquid at a frequency of 4 kHz. Accordingly, the printing paper is conveyed at a rate of approximately 170 mm/sec. The Bk ink head 101Bk is 40 mm apart from the processing liquid head 101S (distance D in FIG. 6), which translates into approximately 0.24 sec as time interval required for ejecting the Bk ink after the processing liquid. Respective ejection amounts of print heads are 30 pl per one time of ejection for the head 101Bk and 15 pl per one time of ejection for other heads.

Preferably, 80% of the self-dispersing type pigment used in this example has a diameter within the range of 0.05 μm to 0.3 μm, more preferably, within the range of 0.1 μm to 0.25 μm.

Figure 9:
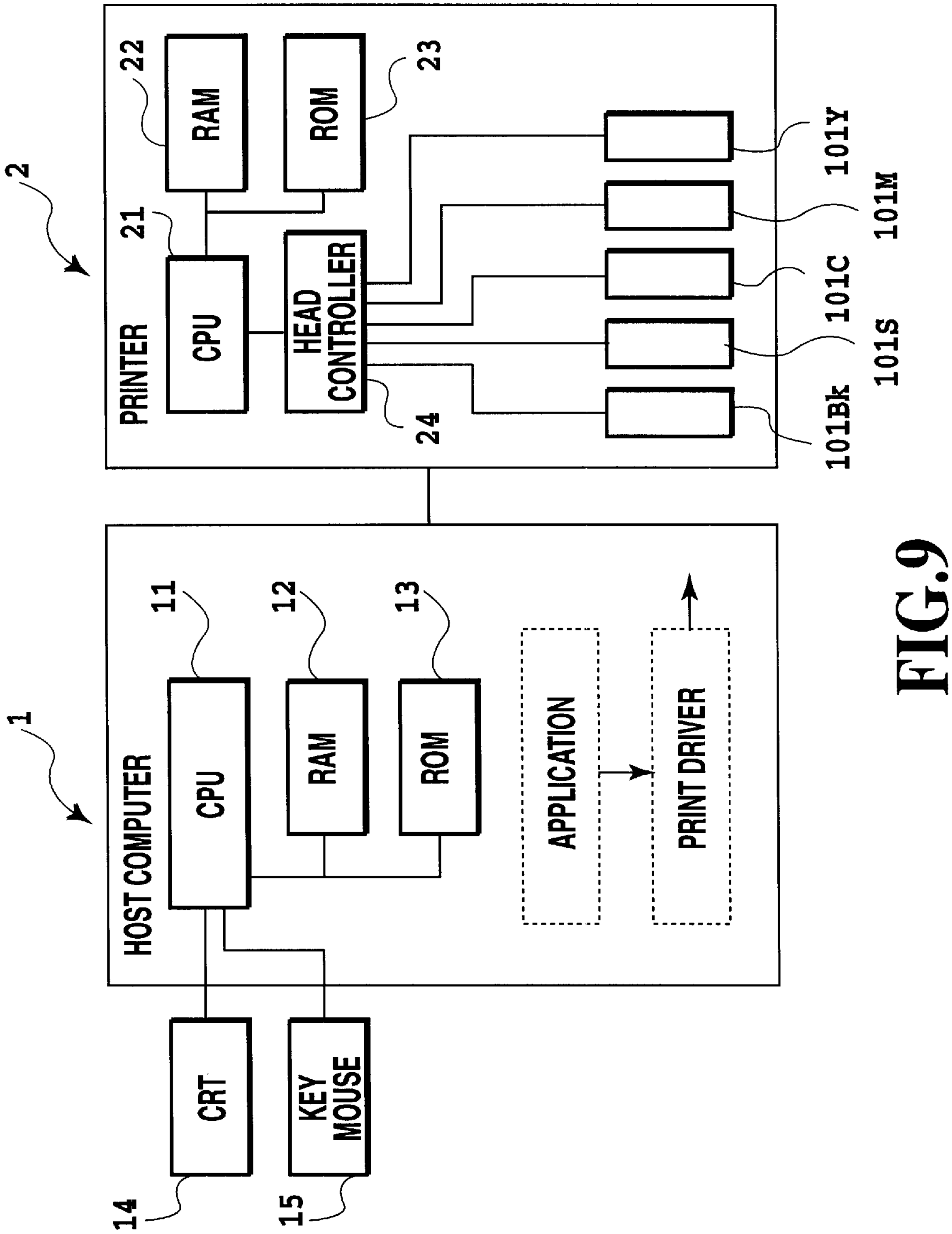
FIG. 9 is a block diagram showing a configuration of a printing system using the printer of the example.

FIG. 9 is a block diagram showing a configuration of a printing system containing the printer of the present example.

This system consists mainly of a host computer 1 and a printer 2. The printer 2 has a mechanical configuration shown in FIG. 6 as well as CPU 21, RAM 22 and ROM 23 as its control configuration. CPU 21 transmits dot-data from a given memory to a head controller 24 while giving control signals to the same to control the drive for the ejection of each print head.

On the other hand, the host computer 1 is provided with CPU 11, RAM 12 and ROM 13. To the host computer 1, CRT 14 and a key mouse 15 as a display device and an input device, respectively, are connected. In this printing system, an application and a printer driver are used as software. More specifically, print data such as characters and images created through CRT 14 and the key mouse 15 in accordance with the application are transferred to the printer driver, thereby converted to bit image data for each print head of the printer 2, and sent to the printer 2.

In this example, a user selects either the plain paper mode or the special medium mode on the application using the CRT 14 and the key mouse 15. When the plain paper mode is selected, the printer driver creates bit image data from the black print data for each of the Bk ink head 101Bk and the processing liquid head 101S. On the other hand, when the special medium mode is selected, the print driver creates bit image data from the black print data for the head 101Bk alone, but not bit image data for the processing liquid head 101S.

As described above, in the plain paper mode, since the processing liquid with a high penetrability is applied to the mixture of pigment ink and dye ink, a high image quality and a high-speed fixing can be obtained at the same time. On the other hand, in the special medium mode, since no processing liquid is used, images of a high quality, which have less crack as compared with the images produced using the processing liquid, can be obtained at a high speed by, for example, one pass print out. Although the pigment without dispersant (self-dispersing type pigment) shall be used in this example, the pigment used may include pigment with dispersant (dispersant containing pigment) as long as the amount is small. In such a case, compositions of the colorant obtained by mixing pigment and die is preferably as follows: the pigment without dispersant is 90 wt. %, the pigment with dispersant is 5 wt. and the dye is 5 wt. %.

It should be understood that print of a higher quality is obtained even if ink of the pigment alone or of the dye alone is used.

Further, the use of no processing liquid has the advantage of lowering running costs no matter how little is used.

EXAMPLE 2

Figure 10:
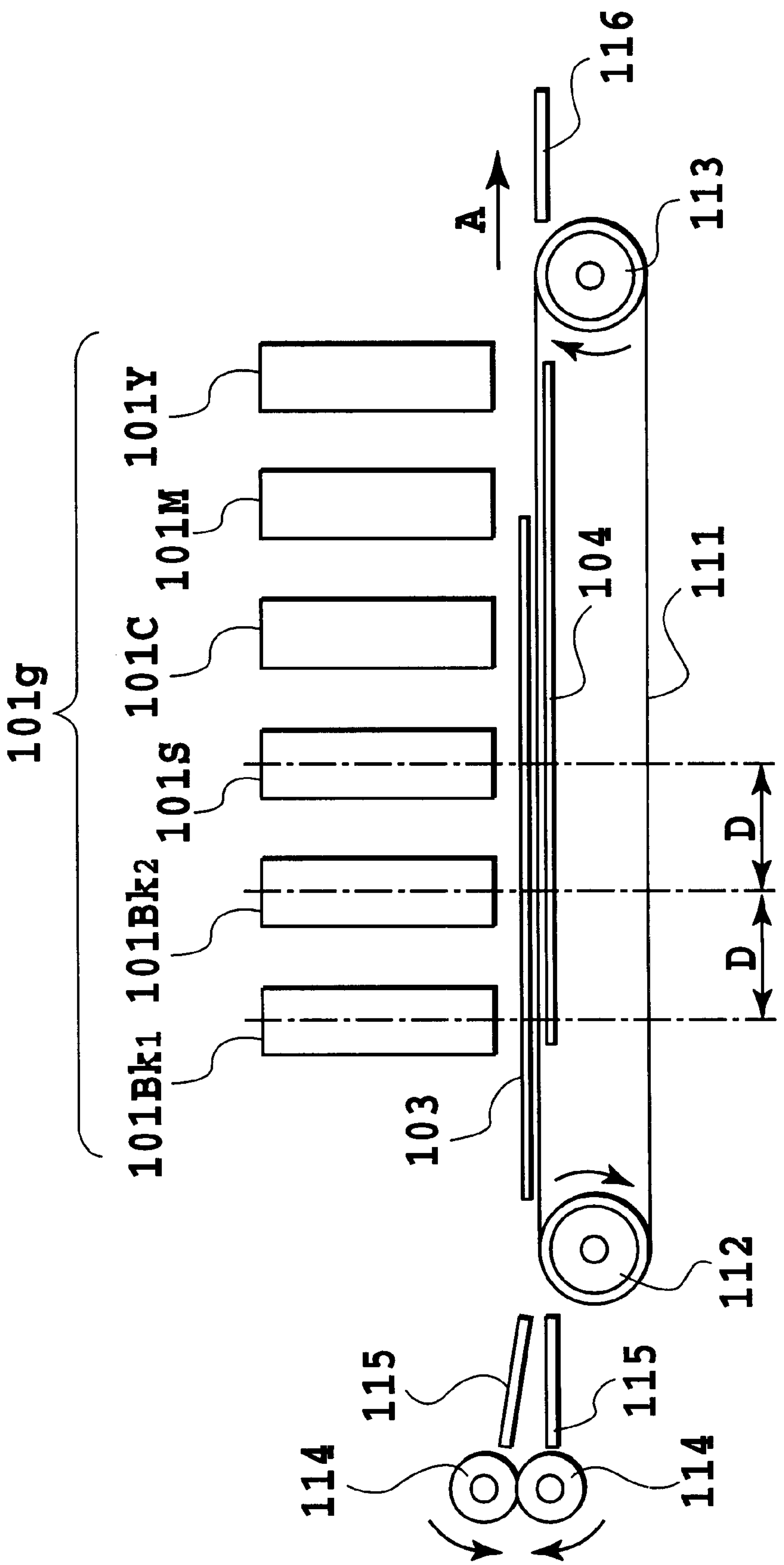
FIG. 10 is a side view showing a general configuration of a printer according to another example of the present invention.

FIG. 10 is a side view generally showing a configuration of a printer in accordance with this example. As seen from the figure, the printer of this example corresponds to Embodiment 2 described above in that it has two heads for ejecting Bk ink: 101Bk1 and 101Bk2.

More specifically, from the head 101Bk1 ejected is Bk ink containing the self-dispersing type pigment (carbon black) as a colorant, and from the head 101Bk2 ejected is Bk ink containing the dye (food black) as a colorant. For the ejection amount of the heads, those of the head 101Bk1 and the head 101Bk2 are 15 pl each, and they only are different from Example 1 described above.

In the above configuration, when selecting the plain paper mode, ejection is carried out in the following order: the head 101Bk1, the head 101Bk2, and the head 101S. On the other hand, when selecting the special medium mode, ejection is carried out in the order of the head 101Bk1 first, then the head 101Bk2 with printing ratio of 100% with respect to dot data, respectively.

As a modification, in the special medium mode, the printing ratio may be set for 80% for the head 101Bk1, and 100% for the head 101Bk2. This allows the amount of the dye applied to increase relative to the amount of the pigment, and makes prevention of crack more effective.

EXAMPLE 3

In this example, Bk inks ejected from the head 101Bk1 and 101Bk2 in Example 2 shown in FIG. 10 are reversed. More specifically, Bk ink containing the dye is ejected from the head 101Bk1 and Bk ink containing the pigment is ejected from the head 101Bk2.

In this case, too, a certain desired result described in the above embodiment 3 can be obtained.

EXAMPLE 4

In this example, two heads for Bk ink are used, just like the above examples. However, from the head 101Bk1 ejected is the ink containing a mixture of the self-dispersing type pigment and the dye in which the amount of the pigment is large relative to that of the dye. In particular, the coloring material ratio of the pigment to the dye is 80% to 20%. On the other hand, from the head 101Bk2, contrary to the head 101Bk1, ejected is the Bk ink containing a mixture of the dye and the above pigment in the ratio of 80% to 20%.

This example is the combination of Example 1 and Example 2, and it should be understood that a certain desired result described above can be obtained in this example, also.

FIG. 11 is a perspective view showing an outline of a serial type printer 5 according to another example of the present invention. It is apparent that the printer which ejects the Bk ink to react it with the processing liquid ejected onto the printing medium before is applicable not only to the above-mentioned full-line type but also to a serial type. The same elements in FIG. 11 as those in FIG. 6 are marked with the same reference signs to omit the description.

The printing paper 103 as the printing medium is inserted into the printer at a paper supply section 105, moves through a printing section 126 and is discharged from the printer. This example uses common, inexpensive paper as the printing paper 103. A carriage 107 in the printing section 126 mounts printing heads 101S, 101Bk, 101C, 101M and 101Y and is adapted to move in both directions along the guide rail 109 by means of a driving force of a motor (not shown). The printing head 101S can eject the processing liquid as described in the above-mentioned Embodiment 1. The printing heads 101Bk, 101C, 101M and 101Y are driven to eject the black, cyan, magenta and yellow inks, respectively, in this order, onto the printing paper 103.

The processing liquid and inks are supplied from respective ink tanks 108Bk, 108S, 108C, 108M and 108Y. An elecro-thermal converting element (heater) is provided for each ejection port of the head and is subjected to supply of an electrical signal to generate thermal energy when the processing liquid or the ink is ejected. The thermal energy generates a bubble in the processing liquid or the ink to eject the processing liquid or the ink by means of pressure of the bubble. Each head is provided with a total of 64 ejection ports at a density of 360 dpi, which are arranged in almost parallel to conveying direction Y of the printing paper 103, or in the direction almost perpendicular to the head scanning direction. An ejection amount for each ejection port can be realized as the amount described in any one of the preceding embodiments.

The heads in this printer are ½ inches apart from each other. Accordingly, a distance between the heads 101S and 101Bk is ½ inches. Further, since a printing density is 720 dpi in the scanning direction and ejection frequency is 7.2 kHz at each head, time interval required for ejecting the Bk ink from the head 101Bk after the processing liquid is ejected from the head 101*s* becomes 0.05 sec.

As is apparent from the above description, according to the above embodiments, it is possible to selectively carry out a mode for performing printing using both ink and the processing liquid jointly and a mode for performing printing not using the processing liquid but using ink alone. Thus, in the case of performing printing on a special printing medium provided with a coat layer formed thereon, for example, the mode using ink alone can be selected, and moreover, as the used ink, ink containing a mixture of the pigment and the dye may be selected to perform printing without causing deterioration in image quality, such as a crack on the coat layer, but printing with a high OD and a high-speed fixing. On the other hand, the mode is selected in which both ink and the processing liquid are used jointly as described above to perform printing in which an edge of the printed image is sharp without feathering and OD is high. Moreover, when the processing liquid is selected to have a high penetrability, in other words, to have a penetrability that agrees with a Ka value, an acetylenol content and surface tension shown in Table 1 described earlier, a high-speed fixing of ink can be also realized.

As a result, it becomes possible to perform printing with high quality and high fixing property on both the plain paper and the special printing medium.

The present invention has been described in detail with respect to preferred embodiments, and it will now be apparent from the foregoing to those skilled in the art that changes and modifications may be made without departing from the invention in its broader aspect, and it is the intention, therefore, in the appended claims to cover all such changes and modifications as fall within the true spirit of the invention.

What is claimed is:

1. An ink printing method of applying ink comprising both a pigment and a dye as a coloring material onto a printing medium to perform printing, said method comprising the steps of:

providing a plurality of printing modes to be set corresponding to mode setting information, the plurality of printing modes including a first printing mode for applying the ink and a processing liquid for causing the coloring material in the ink to be insoluble or coagulated onto the printing medium and a second printing mode for applying the ink onto the printing medium without the processing liquid; and selecting one mode corresponding to the mode setting information among the plurality of printing modes in accordance with a type of the printing medium.

2. An ink printing method for applying ink comprising a pigment ink having pigment as a coloring material and a dye ink having a dye as a coloring material onto a printing medium to perform printing, said method comprising the steps of:

providing a plurality of printing modes to be set corresponding to mode setting information, the plurality of printing modes including a first printing mode that applies the ink and a processing liquid for causing the coloring material in the ink to be insoluble or coagulated onto the printing medium and a second printing mode that applies the ink onto the printing medium without the processing liquid; and selecting one mode corresponding to the mode setting information among the plurality of printing modes in accordance with a type of the printing medium to perform printing.

3. An ink printing method as claimed in claim 1, wherein the ink is applied to the printing medium followed by the processing liquid.

4. An ink printing method as claimed in claim 2, wherein the pigment ink is first applied to the printing medium, the dye ink is thereafter applied and the processing liquid is thereafter applied.

5. An ink printing method as claimed in claim 2, wherein the dye ink is first applied to the printing medium, the pigment ink is thereafter applied and the processing liquid is thereafter applied.

6. An ink printing method as claimed in claim 4, wherein printing ratios of the dye ink and the pigment ink are made different from each other.

7. An ink printing method as claimed in claim 1, wherein the pigment is self-dispersing.

8. An ink printing method as claimed in claim 1, wherein the processing liquid has a higher penetrability than the ink has.

9. An ink printing method as claimed in claim 7, wherein the pigment is carbon black.

10. An ink printing method as claimed in claim 9, wherein the coloring material includes carbon black and dye.

11. An ink printing method as claimed in claim 1, wherein the processing liquid contains a nonionic surface active agent as a penetrant.

12. An ink printing method as claimed in claim 1, wherein the processing liquid contains a nonionic surface active agent as a penetrant at a concentration equal to or more than critical micelle concentration in water.

13. An ink printing method as claimed in claim 1, wherein the ink and the processing liquid are applied to the printing medium by pressure from a bubble generated in the ink and the processing liquid, respectively, by using thermal energy.

14. An ink printing apparatus for applying ink comprising both a pigment and a dye as a coloring material from a print head onto a printing medium to perform printing, said apparatus comprising:

mode setting means for setting one of (i) a first printing mode for applying the ink and a processing liquid for causing the coloring material in the ink to be insoluble or coagulated onto the printing medium and (ii) a second printing mode for applying the ink onto the printing medium without the processing liquid; and print performing means for selecting the mode in accordance with a type of the printing medium to perform printing.

15. An ink printing apparatus for applying ink including a pigment ink having pigment as a coloring material and a dye ink having a dye as a coloring material onto a printing medium to perform printing, said apparatus comprising:

mode setting means for setting one of (i) a first printing mode for applying the ink and a processing liquid for causing the coloring material in the ink to be insoluble or coagulated onto the printing medium and (ii) a second printing mode for applying the ink onto the printing medium without the processing liquid; and print performing means for selecting the mode in accordance with a type of the printing medium to perform printing.

16. An ink printing apparatus as claimed in claim 14, wherein the ink is applied to the printing medium followed by the processing liquid.

17. An ink printing apparatus as claimed in claim 15, wherein the pigment ink is first applied to the printing medium, the dye ink is thereafter applied and the processing liquid is thereafter applied.

18. An ink printing apparatus as claimed in claim 15, wherein the dye ink is first applied to the printing medium, the pigment ink is thereafter applied and the processing liquid is thereafter applied.

19. An ink printing apparatus as claimed in claim 17, wherein printing ratios of the dye ink and the pigment ink are made different from each other.

20. An ink printing apparatus as claimed in claim 14, wherein the pigment is self-dispersing.

21. An ink printing apparatus as claimed in claim 14, wherein the processing liquid has a higher penetrability than the ink has.

22. An ink printing apparatus as claimed in claim 21, wherein the pigment is carbon black.

23. An ink printing apparatus as claimed in claim 22, wherein the coloring material includes carbon black and dye.

24. An ink printing apparatus as claimed in claim 14, wherein the processing liquid contains a nonionic surface active agent as a penetrant.

25. An ink printing apparatus as claimed in claim 14, wherein the processing liquid contains a nonionic surface active agent as a penetrant at a concentration equal to or more than critical micelle concentration in water.

26. An ink printing apparatus as claimed in claim 14, wherein the print head applies the ink and the processing liquid to the printing medium by pressure from a bubble generated in the ink and the processing liquid, respectively, by using thermal energy.

27. An ink printing method of applying ink comprising a pigment as a coloring material onto a printing medium to perform printing, said method comprising the steps of:

providing a plurality of printing modes to be set corresponding to mode setting information, the plurality of printing modes including a printing mode for applying the ink and a processing liquid for causing the coloring material in the ink to be insoluble or coagulated onto the printing medium and a printing mode for applying the ink onto the printing medium without the processing liquid; and selecting one mode corresponding to the mode setting information among the plurality of printing modes in accordance with a type of the printing medium, wherein the processing liquid contains a nonionic surface active agent as a penetrant at a concentration equal to or more than critical micelle concentration in water.

28. An ink printing apparatus for applying ink comprising a pigment as a coloring material from a print head onto a printing medium to perform printing, said apparatus comprising:

mode setting means for setting a plurality of printing modes to be set corresponding to mode setting information, the plurality of modes including a printing mode for applying the ink and a processing liquid for causing the coloring material in the ink to be insoluble or coagulated onto the printing medium and a printing mode for applying the ink onto the printing medium without the processing liquid; and print performing means for selecting one mode corresponding to the mode setting information among the plurality of printing modes in accordance with a type of the printing medium to perform printing, wherein the processing liquid contains a nonionic surface active agent as a penetrant at a concentration equal to or more than critical micelle concentration in water.

* * * * *

UNITED STATES PATENT AND TRADEMARK OFFICE

CERTIFICATE OF CORRECTION

PATENT NO. : 6,550,904 B2 
DATED : April 22, 2003
INVENTOR(S) : Noribumi Koitabashi et al.

It is certified that error appears in the above-identified patent and that said Letters Patent is hereby corrected as shown below:

Column 2,
Line 36, "particular," should read -- particularly, --.

Column 5,
Line 2, "above described" should read -- above-described --.

Column 6,
Line 50, "is" should be deleted.

Column 9,
Line 2, "ink(liquid)" should read -- ink (liquid) --.
Line 3, "ink(liquid)." should read -- ink (liquid). --.
Line 33, "associated" should read -- associated with --.

Column 14,
Line 15, "101*s*" should read -- 101S --.

Signed and Sealed this

Eighteenth Day of November, 2003

JAMES E. ROGAN
*Director of the United States Patent and Trademark Office*